United States Patent
Higgins (10) Patent No.: US 12,460,705 B1
(45) Date of Patent: Nov. 4, 2025

(54) MULTI-DIRECTIONAL RADIAL CLUTCH TO STORE POTENTIAL ENERGY

(71) Applicant: Matthew Higgins, Albuquerque, NM (US)

(72) Inventor: Matthew Higgins, Albuquerque, NM (US)

( * ) Notice: Subject to any disclaimer, the term of this patent is extended or adjusted under 35 U.S.C. 154(b) by 0 days.

(21) Appl. No.: 18/804,299

(22) Filed: Aug. 14, 2024

Related U.S. Application Data (60) Provisional application No. 63/524,000, filed on Jun. 29, 2023.

(51) Int. Cl.
*F16H 33/06* (2006.01)
*F16H 33/02* (2006.01)

(52) U.S. Cl.
CPC .............. *F16H 33/06* (2013.01); *F16H 33/02* (2013.01)

(58) Field of Classification Search
CPC .................................. F16H 33/02; F16H 33/06
See application file for complete search history.

(56) References Cited

U.S. PATENT DOCUMENTS

2017/0009860 A1* 1/2017 Tsuchiya ................. F16H 33/06

* cited by examiner

Primary Examiner — Terence Boes
(74) Attorney, Agent, or Firm — Kameron W. Kramer (57) ABSTRACT

An apparatus to store and release potential energy. Two clutch bodies, radial ring, first and second crossbars, and first and second radial tees are disposed on an axle. Sets of radial spring tube assemblies are attached to both the first radial tee and the second radial tee, and the distal ends of the sets of radial spring tube assemblies are each attached to the radial ring. The radial spring tube assemblies store energy via springs when the axle is rotated and the first clutch body and the second clutch body are engaged, which in turn rotates the first radial tee and the second radial tee while the radial ring remains stationary. The first clutch body and the second clutch body disengage when a brake on the radial ring is released, thus allowing the stored potential energy in the radial spring tube assemblies to be released.

7 Claims, 8 Drawing Sheets

MULTI-DIRECTIONAL RADIAL CLUTCH TO STORE POTENTIAL ENERGY

CROSS-REFERENCE TO RELATED APPLICATION

This application claims the benefit of U.S. Provisional Patent Application Ser. No. 63/524,000 filed Jun. 29, 2023, titled "A multi-directional radial clutch to store potential energy", and the subject matter thereof is incorporated herein by reference thereto.

TECHNICAL FIELD

The present invention relates to potential energy systems, and more specifically to a multi-directional radial clutch to store potential energy.

BACKGROUND ART

Potential energy systems using torque to store energy are often inefficient and are plagued by friction. Existing clutches utilize hydraulic fluid and plungers, or pulley and lever configurations. These devices typically require submersion in petroleum based lubricating amount working parts. The present invention allows for transfer of potential energy between two rotating bodies, and transfer potential energy to increase rotations. The invention does not require submersion in petroleum lubricants among parts.

As stated above, potential energy systems using torque to store energy are often inefficient and are plagued by friction. The present invention solves this problem. The present invention stores potential energy in a radial manner and is able to receive energy stored for efficient discharge in a clockwise and counterclockwise manner. The present invention differs from what currently exists. Current systems are limited to the amount of energy stored based on size and typically use friction plates. The present invention allows for variable input force and does not use friction plates.

The present invention overcomes the shortcomings contained in the prior art by providing a system that utilizes radial spring assemblies to increase storage and output of a torque generating system. None of the prior art fully addresses the problems resolved by the present invention. The present invention overcomes these limitations contained in the prior art.

Certain embodiments of the invention have other steps or elements in addition to or in place of those mentioned above. The steps or element will become apparent to those skilled in the art from a reading of the following detailed description when taken with reference to the accompanying figures, if any.

DETAILED DESCRIPTION OF THE INVENTION

The best mode for carrying out the invention will be described herein. The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. To avoid obscuring the present invention, some well-known system configurations, and process steps are not disclosed in detail. The figures illustrating embodiments of the system, if any, are semi-diagrammatic and not to scale and, particularly, some of the dimensions are for the clarity of presentation and are shown exaggerated in the drawing figures.

Alternate embodiments have been included throughout, and the order of such are not intended to have any other significance or provide limitations for the present invention.

For expository purposes, the term "horizontal" as used herein is defined as a plane parallel to the plane or surface of the present apparatus, regardless of its orientation. The term "vertical" refers to a direction perpendicular to the horizontal as just defined. Terms, such as "above", "below", "bottom", "top", "side", "higher", "lower", "upper", "over", and "under", are defined with respect to the horizontal plane, as shown in the figures, if any. The term "on" means that there is direct contact among elements.

The words "including", "comprising", "incorporating", "consisting of", "have", and "is" are meant to be non-exclusive, meaning additional items, components or elements may be present. Joinder references such as "connected", "connecting", and "coupled" do not limit the position, orientation, or use of systems and/or methods, and do not necessarily infer that two elements are directly connected. All identifying numerical terms are for identification only, and do not refer to the order or preference of any element, embodiment, variation and/or modification.

The present disclosure provides an apparatus to store potential energy, the apparatus comprising: a first clutch body and a second clutch body; a radial ring; an axle; a first crossbar and a second crossbar; a first radial tee and a second radial tee, wherein each of the first clutch body, the second clutch body, the radial ring, the first crossbar, the second crossbar, the first radial tee, and the second radial tee are disposed on the axle, wherein the first clutch body, the second clutch body, the first crossbar, and the first radial tee are disposed on the first side of the radial ring and the second crossbar the second radial tee are disposed on the second side of the radial ring; and a first set of radial spring tube assemblies and a second set of radial spring tube assemblies, wherein each of the radial spring tube assemblies comprises a radial spring, wherein the first end of each of the first set of radial spring tube assemblies is hingeably attached near the distal ends of the first crossbar, wherein the distal ends of the first crossbar are attached to the first tee, wherein the distal end of each of the first set of radial spring tube assemblies is hingeably attached to the radial ring; wherein the first end of each of the second set of radial spring tube assemblies is hingeably attached near the distal ends of the second crossbar, wherein the distal ends of the second crossbar are attached to the second tee, and wherein the distal end of each of the second set of radial spring tube assemblies is hingeably attached to the radial ring.

The present disclosure further provides an apparatus to store potential energy wherein a torque generating system is attached to the axle on the first side of the radial ring and a torque receiving system is attached to the axle on the second side of the radial ring; wherein when torque is supplied to the axle, the first radial tee and the second radial tee spin, while the radial ring does not rotate in order to compress the radial springs of the first set of radial spring tube assemblies and the second set of radial spring tube assemblies; wherein a brake holds prevents the radial ring from rotating; wherein the first clutch body and the second clutch body are releasable, which allows the second clutch body to spin freely when released; wherein each of the first clutch body, the second clutch body, the first crossbar, the first radial tee, the radial ring, the second crossbar, and the second radial tee are disposed on the axle such that they spin freely once the first clutch body and the second clutch body are disengaged.

The present disclosure provides a method of storing potential energy, the method comprising: applying torque to an axle, wherein each of a first clutch body, a second clutch body, a radial ring, a first crossbar, a second crossbar, a first radial tee, and a second radial tee are disposed on the axle, wherein the first end of each of a first set of radial spring tube assemblies is hingeably attached near the distal ends of the first crossbar, wherein the distal ends of the first crossbar are attached to the first tee, wherein the distal end of each of the first set of radial spring tube assemblies is hingeably attached to the radial ring, wherein the first end of each of the second set of radial spring tube assemblies is hingeably attached near the distal ends of the second crossbar, wherein the distal ends of the second crossbar are attached to the second tee, wherein the distal end of each of the second set of radial spring tube assemblies is hingeably attached to the radial ring, wherein each of the radial spring tube assemblies comprises a radial spring; storing energy in the radial springs as the axle rotates the first radial tee and the second radial while the radial ring is held in place by a brake, wherein the radial springs are compressed; releasing the stored energy by releasing the brake which in turn de-couples the first clutch body from the second clutch body which allows the radial ring to spin freely with the first radial tee and the second radial tee; and applying the released stored energy to a torque receiving system.

Figure 1:
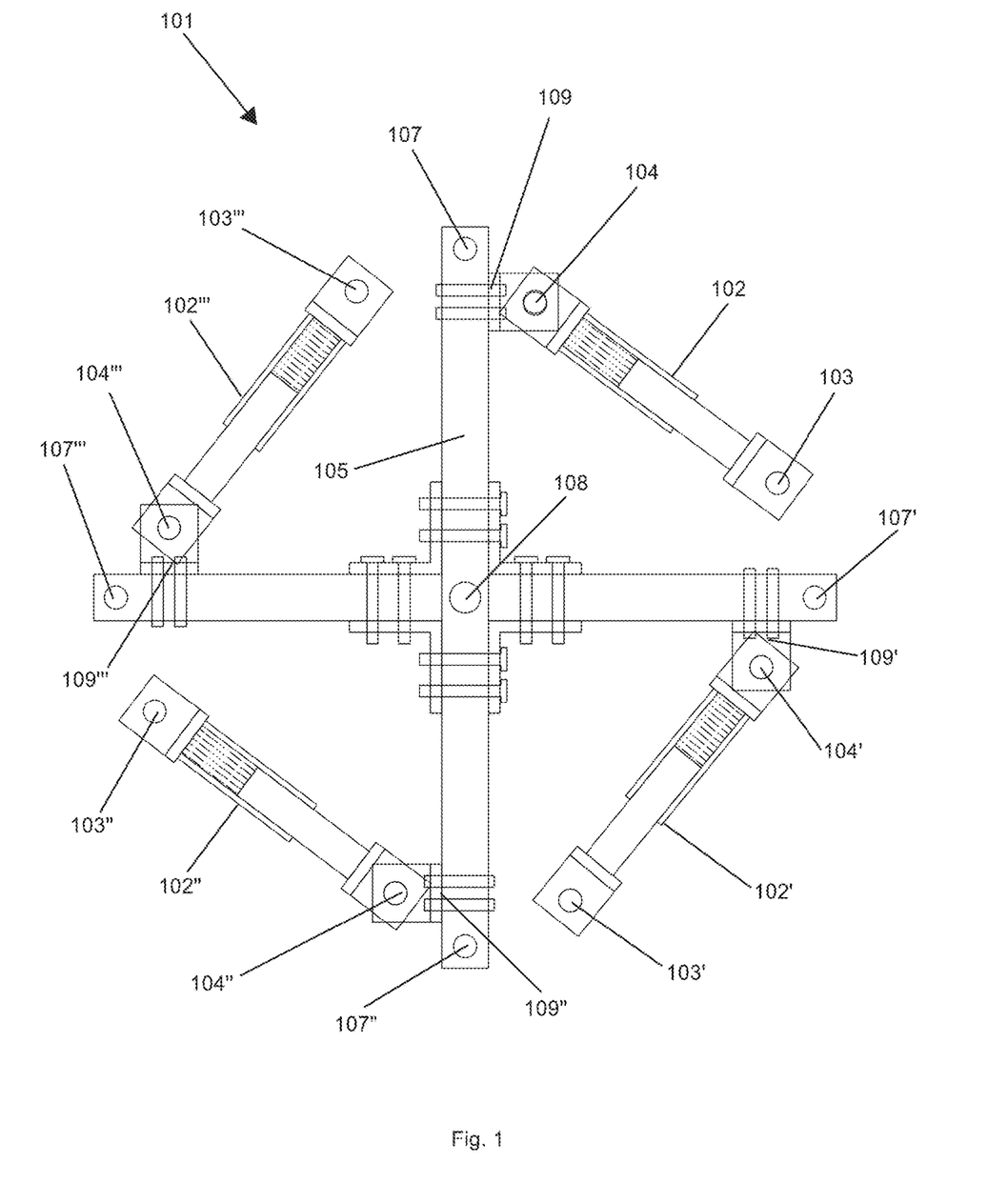
FIG. 1 illustrates a front side view of radial spring assembly.

FIG. 1 illustrates a front side view of radial spring assembly 101. Radial spring tube assemblies 102, 102', 102", and 102'" are hingeably attached to crossbar 105 via hingeable crossbar connection points 109, 109', 109", and 109'" and hingeable connection points 104, 104', 104", and 104'", respectively. Radial ring connection points 103, 103', 103", and 103'" are disposed on the distal ends of radial spring tube assemblies 102, 102', 102", and 102'", respectively.

Radial tee connection points 107, 107', 107", and 107'" are disposed near the distal ends of crossbar 105, respectively. Axle connection point 108 is at the center of crossbar 105.

Figure 2:
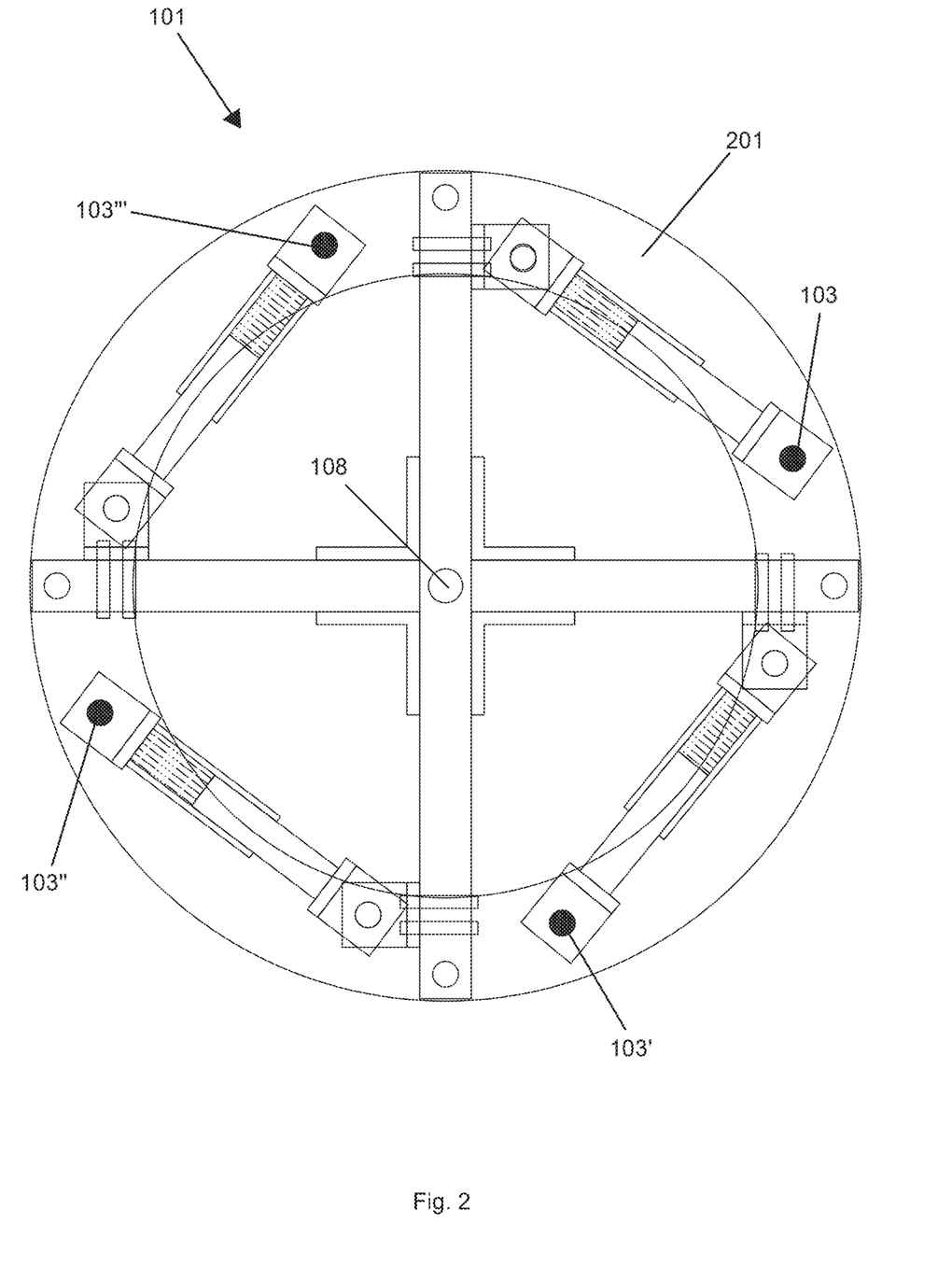
FIG. 2 illustrates a front side view of radial spring assembly attached to radial ring.

FIG. 2 illustrates a front side view of radial spring assembly 101 attached to radial ring 201. Radial ring connection points 103, 103', 103", and 103'" are each hingeably attached to radial ring 201. Radial ring is only connected to radial spring assembly 101 at radial ring connection points 103, 103', 103", and 103'". In this view, parts of radial spring assembly 101 are shown that would not be in view, but for clarity sake, they are shown. The key to this drawing are the radial ring connection points 103, 103', 103", and 103'" and their attachment to radial ring 201.

Figure 3:
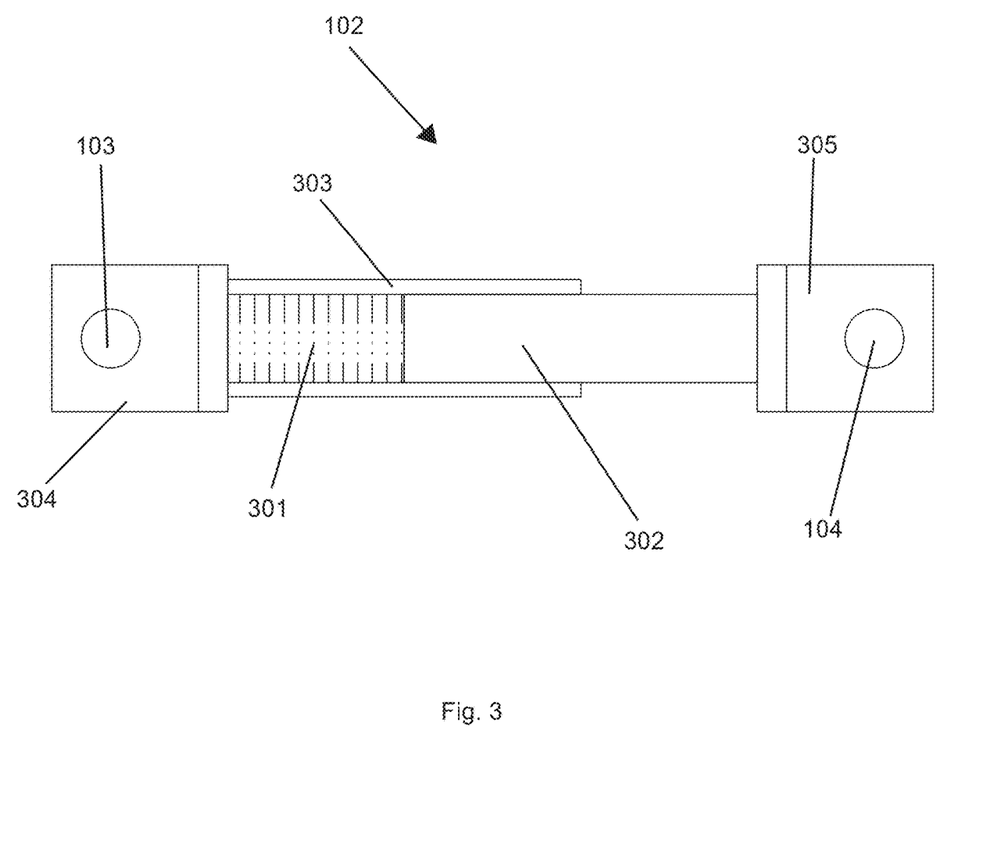
FIG. 3 illustrates a front side view of radial spring tube assembly.

FIG. 3 illustrates a front side view of radial spring tube assembly 102. Although multiple radial spring tube assemblies are present, being 102, 102', 102", and 103'", only one is shown here. All radial spring tube assemblies 102, including all components therein, are identical. Radial spring tube assembly 102 is comprised of inner tube 302 which fits into outer tube 303. Radial spring 301 is disposed in inner tube 302. Inner tube 302 fits snuggly into outer tube 303 as such to create pressure in order to compress radial spring 301. Radial ring connection point 103 is disposed on radial ring end cap 304. Hingeable connection point 104 is disposed on hingeable connection end cap 305. Radial ring end cap 304 and hingeable connection end cap 305 are connected to outer tube 303 and inner tube 302, respectively, and are closed on the distal ends.

Figure 4:
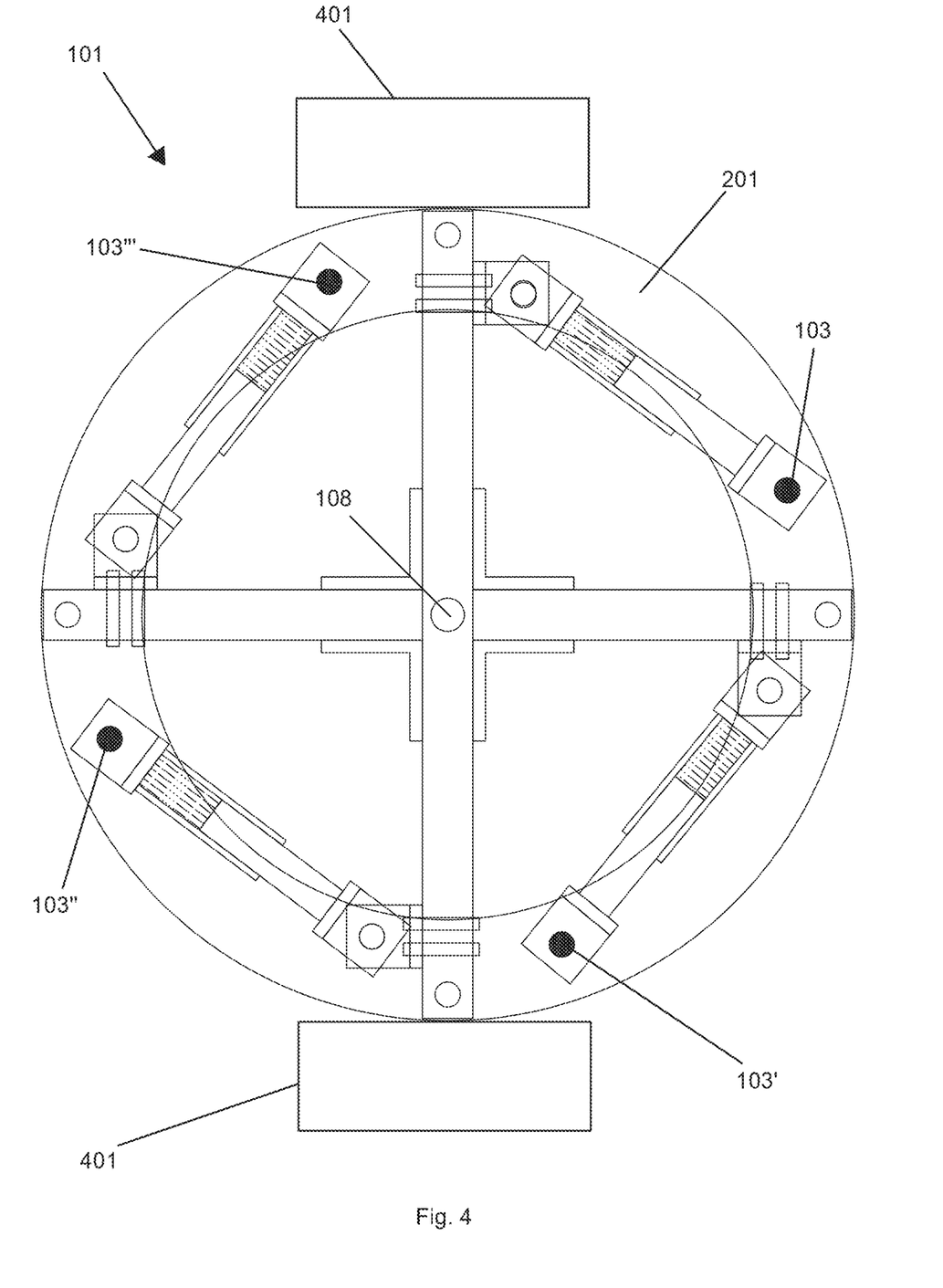
FIG. 4 illustrates a front side view of a brake attached to radial ring.

FIG. 4 illustrates a front side view of brake 401 attached to radial ring 201. Brake 401 is mounted onto radial ring 201 to prevent radial ring 201 from spinning when torque is supplied to axle 706 (shown in FIG. 7). Brake 401 is disposed on the base (as described below) and attaches to first clutch body 505 and/or second clutch body 506 (shown in FIG. 5). First clutch body 505 and second clutch body 506 may be disposed in a clutch body, which is not shown. Brake 401 acts to hold radial ring 201 in place when first radial tee 503 (shown in FIG. 5) and second radial tee 602 (shown in FIG. 6) are rotating. When brake 401 is released, first clutch body 505 and second clutch body 506 are decoupled, thus allowing radial ring 201 to spin freely with first radial tee 503 (shown in FIG. 5) and second radial tee 602 (shown in FIG. 6), as well as other components.

Figure 5:
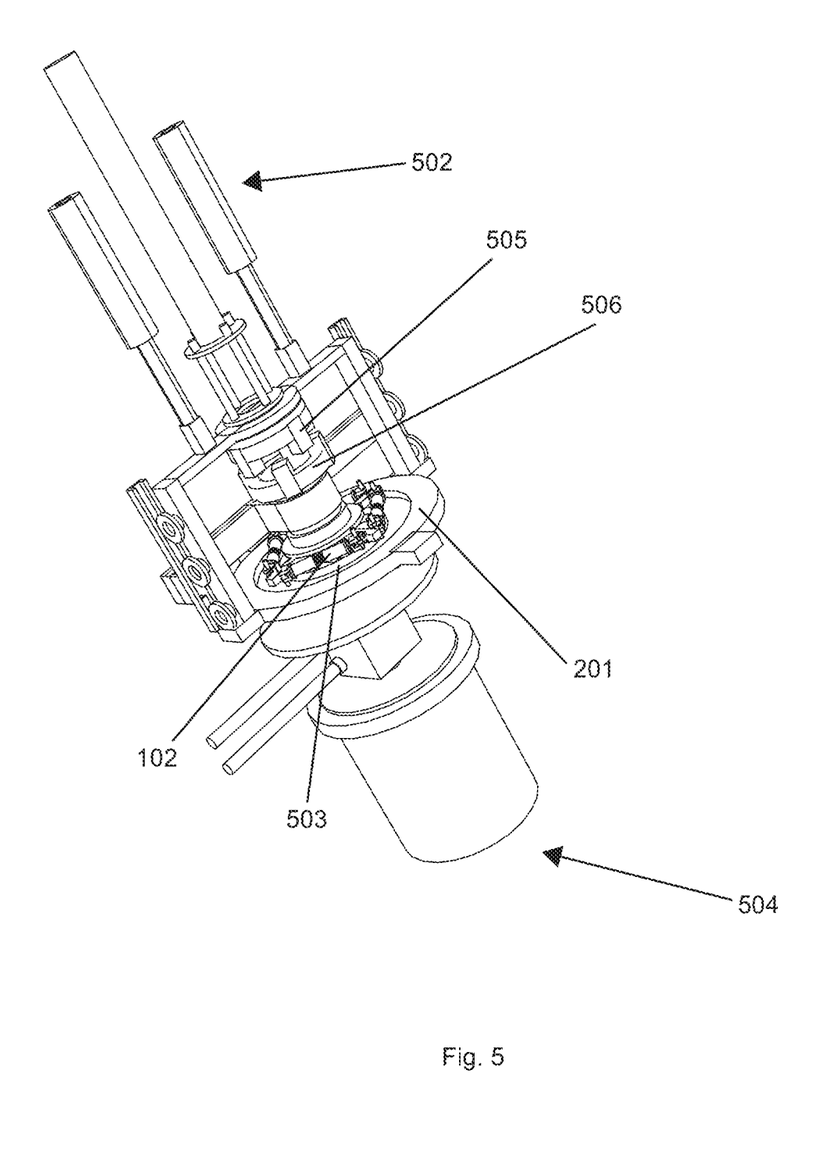
FIG. 5 illustrates a perspective partial view of a torque generating system.

FIG. 5 illustrates a perspective partial view of torque generating system 502. First radial tee 503, radial ring 201, and crossbar 105 are mounted on axle 706 (shown in FIG. 7) of torque generating system 502. Radial spring tube assembly 102 can also be seen in this view. First clutch body 505 and second clutch body 506 are shown in the engaged position.

Figure 6:
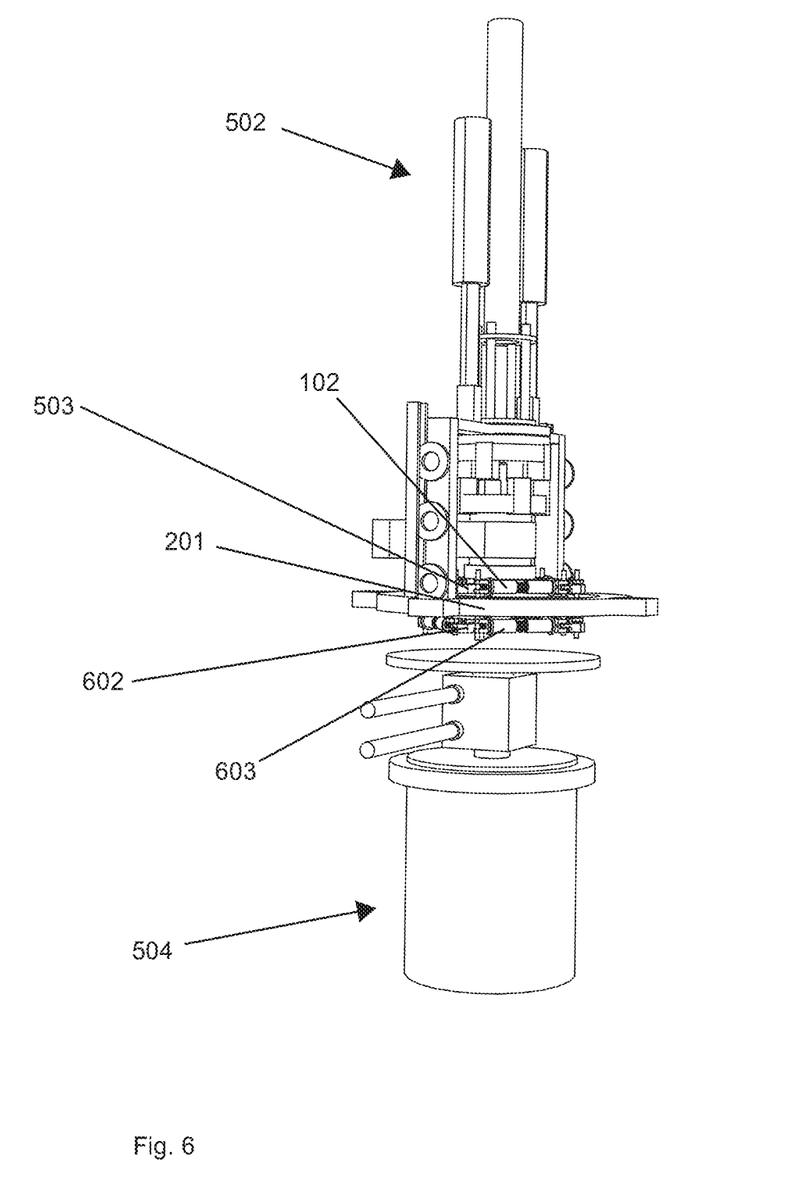
FIG. 6 illustrates a side view of a torque generating system.

FIG. 6 illustrates a side view of torque generating system 502. In this view, second radial tee 602 is shown. Torque receiving system 504 is any type of system that utilizes the torque generated by torque generating system 502. First radial tee 503 and second radial tee 602 are mounted on axle 706. A second set of radial spring tube assemblies 603, 603', 603", and 603'" is present, while only radial spring tube assembly 603 is shown. Radial spring tube assemblies 603, 603', 603", and 603'" are hingeably attached to second radial tee 602 and radial ring 201 the same way that radial spring tube assemblies 102, 102', 102", and 102'" are attached to first radial tee 503 and radial spring 201.

Figure 7:
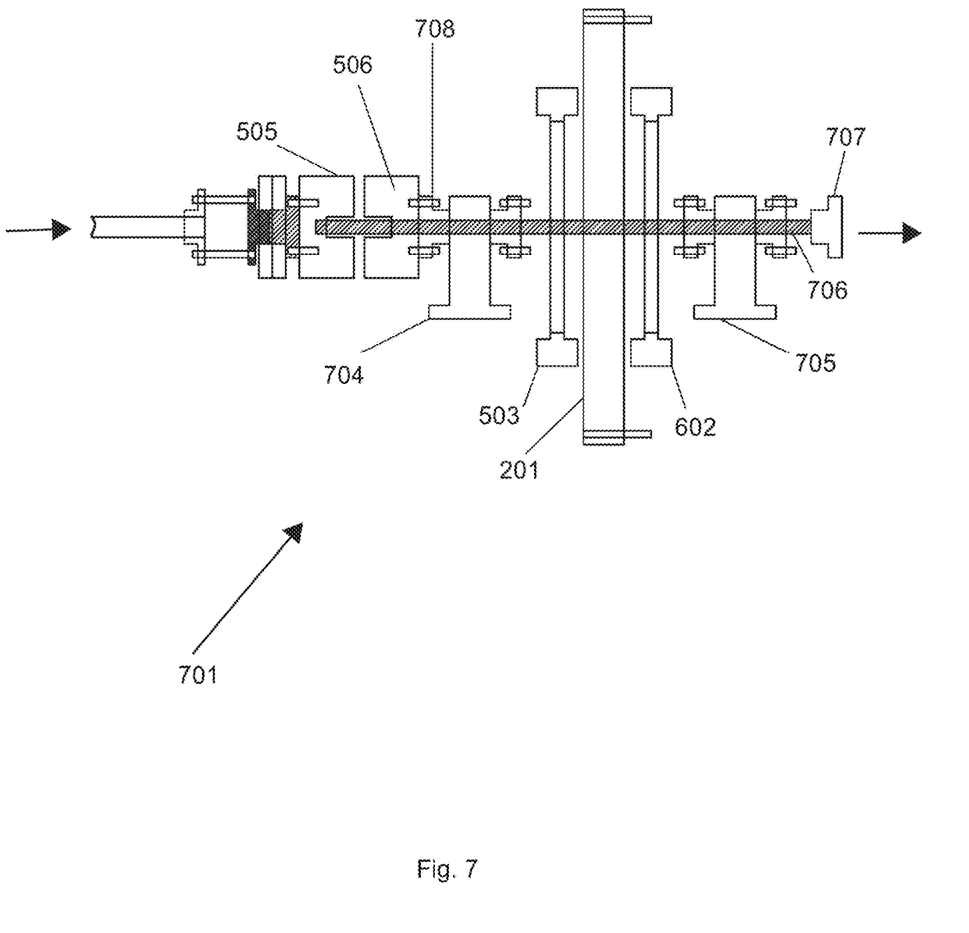
FIG. 7 illustrates a schematic diagram of the system of the present invention.

FIG. 7 illustrates a schematic diagram of system 701 of the present invention. Torque generating system 502 comprises any system or apparatus that provides torque to axle 706. First clutch body 505 and second clutch body 506 are disposed on axle 706. Pillow blocks 704 and 705 are mounted on a base (as described below and not shown) and act to suspend system 701 above the base, whatever that may be. First radial tee 503 and second radial tee 602 are on the two sides of radial ring 201. Axle 706 continues to torque receiving system 504, whereby the torque is used to power any number of systems. Compression end cap 707 acts to engage torque receiving system 504 (typically, a turbine) to receive the potential energy as kinetic energy upon release of brake 401. Any number of other elements are included in system 701, including, but not limited to, connection points, bolts, motors, etc. Various connectors 708 are present throughout system 701. Connectors 708 may comprises any type of suitable connectors.

The arrow on the left hand side indicates the flow of the provided torque into system 701, and the arrow on the right hand side shows the torque output from system 701.

Radial tee connection points 107, 107', 107", and 107''' on crossbar 105 of radial spring assembly 101 are attached to first radial tee 503. Radial ring connection points 103, 103', 103", and 103''' are attached to radial ring 201. Thus, radial spring tube assemblies 102, 102', 102", and 102''' are attached to both the first radial tee 503 (via crossbar 105) and radial ring 201. In order to build up energy, torque generating system 502 spins first radial tee 503, while radial ring 201 stays in place in order to compress radial springs 301, 301', 301", and 301'''. Brake 401 holds radial ring 201 in place. Once radial springs 301, 301', 301", and 301''' are compressed, brake 401 is released, and the initial energy is released and first radial tee 503 and radial ring 201 spin together.

Elements of system 701 are disposed on, or suspended above a base, which is not shown. The base can be any suitable base to attach the necessary elements to. Specifically, any of pillow blocks 704 and 705, brake 401, torque generating system 502, and torque receiving system 504 are mounted on the base, while the other elements are suspended above the base by axle 706 and/or the other elements, such as the pillow blocks 704 and 705. Any of the other elements may also be mounted on the base, as well as other elements that have not be explicitly detailed herein.

Compression end cap 707 releases energy to torque receiving system 504. When compression end cap 707 is released by the action of system 701, specifically brake 401, compression end cap 707 allows axle 706 to release the stored energy to torque receiving system 504.

As shown in FIG. 6, a second radial tee 602 is present on the other side of radial ring 201. All components in FIGS. 1, 2, and 3 are repeated on this other side of radial ring 201. This allows double the amount of energy to be released and stored by the present invention.

When first clutch body 505 and second clutch body 506 are connected (or engaged), torque generating system 502 provides torque to axle 706. First clutch body 505 may be disconnected from second clutch body 506 which allows first radial tee 503, second radial tee 602, and radial ring 201, along with other components, to spin freely. Brake 401 is connected to first clutch body 505 and/or second clutch body 506 such that when brake 401 is disengaged from radial ring 201, first clutch body 505 is also disengaged second clutch body 506.

FIGS. 5, 6, and 7 show additional elements that have not been called out herein but may be necessary in order for the radial spring assembly 101 to be utilized. The key parts of the system as described herein in order to store and release potential energy are: the first clutch body 505, second clutch body 506, first radial tee 503, second radial tee 602, radial ring 201, brake 401, and radial spring assembly 101, which further comprises radial spring tube assemblies 102, 102', 102", and 102''' which are hingeably attached to crossbar 105 via hingeable crossbar connection points 109, 109', 109", and 109''' and hingeable connection points 104, 104', 104", and 104''', respectively. Radial ring connection points 103, 103', 103", and 103''' are located near distal ends of radial spring tube assemblies 102, 102', 102", and 102''', respectively. Radial tee connection points 107, 107', 107", and 107''' are disposed near the distal ends of crossbar 105, respectively. Axle connection point 108 is at the center of crossbar 105. The various components are attached rotatably to axle 706. Other elements may be included or deleted from the system, as well as the position of the various elements may be changed. The figures are not necessarily graphical representations of how the various elements may look in order to function.

Figure 8:
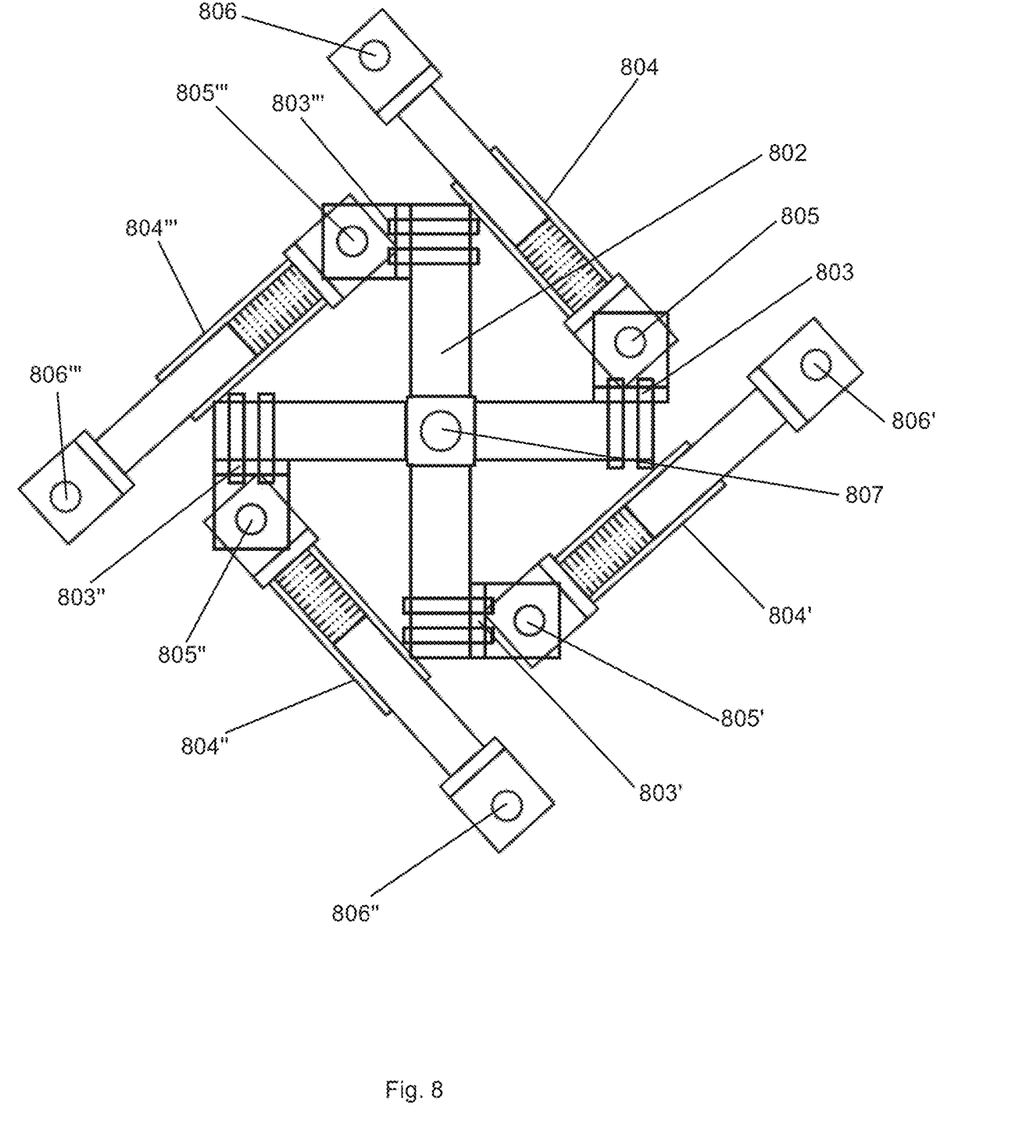
FIG. 8 illustrates a front side view of staggered radial spring assembly of an alternate embodiment.

FIG. 8 illustrates a front side view of staggered radial spring assembly 801 of an alternate embodiment. Radial spring tube assemblies 804, 804', 804", and 804''' are hingeably attached to crossbar 802 via hingeable crossbar connection points 803, 803', 803", and 803''' and hingeable connection points 805, 805', 805", and 805''', respectively. Radial ring connection points 806, 806', 806", and 806''' are located near distal ends of radial spring tube assemblies 804, 804', 804", and 804''', respectively. Hingeable connection points 805, 805', 805", and 805''' are attachable to first radial tee 503 and are disposed near the distal ends of crossbar 802. Axle connection point 807 is at the center of crossbar 802. Staggered radial spring assembly 801 functions in the same manner as radial spring assembly 101 insofar as how it connects to the first radial tee 503, second radial tee 602, axle 706, and other components of system 701, as well as the storing and releasing of energy.

Any number of radial spring tube assemblies may be used, as well as any number of the other elements, in any combination. Additional elements may be present, and any of the elements may be deleted and/or moved in the system.

Radial spring tube assemblies 102, 102', 102", and 102''' and 804, 804', 804", and 804''' store energy in the radial springs 301, 301', 301", and 301''' (and the corresponding radial springs contained in radial spring tube assemblies 804, 804', 804", and 804''', not shown in the FIGS.). These radial spring tube assemblies utilize a plunger style system in order to build up and store the energy in the radial springs. When system torque generating system 502 applies energy to axle 706, first radial tee 503 and second radial tee 602 rotate, while radial ring 201 is stationary. This rotation of first radial tee 503 and second radial tee 602 cause radial springs 301, 301', 301", and 301''' (and the corresponding radial springs contained in radial spring tube assemblies 804, 804', 804", and 804''', not shown in the FIGS.) in radial spring tube assemblies 102, 102', 102", and 102''' and 804, 804', 804", and 804''', respectively, to be compressed since one end of radial spring tube assemblies 102, 102', 102", and 102''' and 804, 804', 804", and 804''' is stationary while the other end of the is rotating.

The present invention ideally comprises two sets of radial spring tube assemblies 102. The distal ends of the radial spring tube assemblies 102 attach to radial ring 201, while the other ends of the radial spring tube assemblies 102 are attached to their respective radial tee. Any number of radial spring tube assemblies may be utilized.

Much like a traditional flange-bearing with two rotating plates held together by lubricated bearings, the present invention's opposing spring assemblies receive low speed input torque on the rotating half of each radial spring tube assembly, while the distal end of each radial spring tube assembly is held in place by the radial ring, which is stationary. As first radial tee 503 and second radial tee 602 rotate, via torque generating system 502, radial spring tube assemblies 102 continue to rotate radial springs 301 are compressed, thus storing the energy.

Radial spring tube assemblies 102 allow for clockwise and counterclockwise input torque because radial springs

301 may be compressed in either direction respective to radial spring tube assemblies 102.

The present invention allows for energy to be stored in the radial spring tube assemblies using either clockwise or counter clockwise rotation because of the opposing spring configuration.

The present invention utilizes any number of elements that have not been specifically called out, including, but not limited to, connectors, flanges, support blocks, bearings, flywheels, tubes, etc., that are required for the function of system 701.

The present invention allows potential energy to be released as kinetic energy upon a separate body.

As shown in FIG. 7, second clutch body 506, first radial tee 503, radial ring 201, and second radial tee 602 (as well as potentially other non-mentioned elements) comprise a "rotating body" and are all connected and are freely rotating about axle 706 upon release of brake 401 and the disengagement of first clutch body 505 and second clutch body 506. Any of the elements may be statically mounted on axle 706 but may have inner rings allowing for free rotation.

The invention produces kinetic energy for use by objects requiring a rotational input. The invention's mass also acts as a weight or ballast for holding associated/related components in place, and when enclosed can provide as a platform for associated/related components.

Torque can be provided to the present invention from any number of sources. Additionally, the torque/energy generated by the invention can be outputted to any number of sources, as desired.

The various connection points, including hingeable connections, may comprise any suitable connection.

As described herein, various elements have multiple corresponding identical elements. As such, references to these elements encompass all identical elements, such as, for example, references to radial spring tube assembly (or assemblies) 102 comprises radial spring tube assemblies 102, 102', 102'', 102''', 603, 603', 603'', and 603'''.

Any number of the elements of the present invention may be included in the present invention, in any combination, and elements may be removed, moved, or substituted, and additional elements may be added.

The best mode for carrying out the invention has been described herein. The previous embodiments are described in sufficient detail to enable those skilled in the art to make and use the invention. It is to be understood that other embodiments would be evident based on the present disclosure, and that system, process, or mechanical changes may be made without departing from the scope of the present invention.

In the previous description, numerous specific details and examples are given to provide a thorough understanding of the invention. However, it will be apparent that the invention may be practiced without these specific details and specific examples. While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters previously set forth herein or shown in the accompanying figures are to be interpreted in an illustrative and non-limiting sense.

What is claimed is:

1. An apparatus to store potential energy, the apparatus comprising:
 a first clutch body and a second clutch body;
 a radial ring;
 an axle;
 a first crossbar and a second crossbar;
 a first radial tee and a second radial tee,
  wherein each of the first clutch body, the second clutch body, the radial ring, the first crossbar, the second crossbar, the first radial tee, and the second radial tee are disposed on the axle,
  wherein the first clutch body, the second clutch body, the first crossbar, and the first radial tee are disposed on the first side of the radial ring and the second crossbar the second radial tee are disposed on the second side of the radial ring; and
 a first set of radial spring tube assemblies and a second set of radial spring tube assemblies,
  wherein each of the radial spring tube assemblies comprises a radial spring,
  wherein the first end of each of the first set of radial spring tube assemblies is hingeably attached near the distal ends of the first crossbar,
  wherein the distal ends of the first crossbar are attached to the first tee,
  wherein the distal end of each of the first set of radial spring tube assemblies is hingeably attached to the radial ring;
  wherein the first end of each of the second set of radial spring tube assemblies is hingeably attached near the distal ends of the second crossbar,
  wherein the distal ends of the second crossbar are attached to the second tee, and
  wherein the distal end of each of the second set of radial spring tube assemblies is hingeably attached to the radial ring.

2. The apparatus to store potential energy of claim 1, wherein a torque generating system is attached to the axle on the first side of the radial ring and a torque receiving system is attached to the axle on the second side of the radial ring.

3. The apparatus to store potential energy of claim 2, wherein when torque is supplied to the axle, the first radial tee and the second radial tee spin, while the radial ring does not rotate in order to compress the radial springs of the first set of radial spring tube assemblies and the second set of radial spring tube assemblies.

4. The apparatus to store potential energy of claim 3, wherein a brake holds the radial ring from rotating.

5. The apparatus to store potential energy of claim 1, wherein the first clutch body and the second clutch body are releasable, which allows the second clutch body to spin freely when released.

6. The apparatus to store potential energy of claim 5, wherein each of the first clutch body, the second clutch body, the first crossbar, the first radial tee, the radial ring, the second crossbar, and the second radial tee are disposed on the axle such that they spin freely once the first clutch body and the second clutch body are disengaged.

7. A method of storing potential energy, the method comprising:
 applying torque to an axle,
  wherein each of a first clutch body, a second clutch body, a radial ring, a first crossbar, a second crossbar, a first radial tee, and a second radial tee are disposed on the axle,
  wherein the first end of each of a first set of radial spring tube assemblies is hingeably attached near the distal ends of the first crossbar,
  wherein the distal ends of the first crossbar are attached to the first tee, wherein the distal end of each of the first set of radial spring tube assemblies is hingeably attached to the radial ring, wherein the first end of each of the second set of radial spring tube assemblies is hingeably attached near the distal ends of the second crossbar, wherein the distal ends of the second crossbar are attached to the second tee, wherein the distal end of each of the second set of radial spring tube assemblies is hingeably attached to the radial ring, wherein each of the radial spring tube assemblies comprises a radial spring;

storing energy in the radial springs as the axle rotates the first radial tee and the second radial while the radial ring is held in place by a brake, wherein the radial springs are compressed;

releasing the stored energy by releasing the brake which in turn de-couples the first clutch body from the second clutch body which allows the radial ring to spin freely with the first radial tee and the second radial tee; and applying the released stored energy to a torque receiving system.

\* \* \* \* \*